D. E. WALKER.
SHIELD FOR RUBBER TIRES.
APPLICATION FILED JUNE 20, 1907.
920,699.
Patented May 4, 1909.
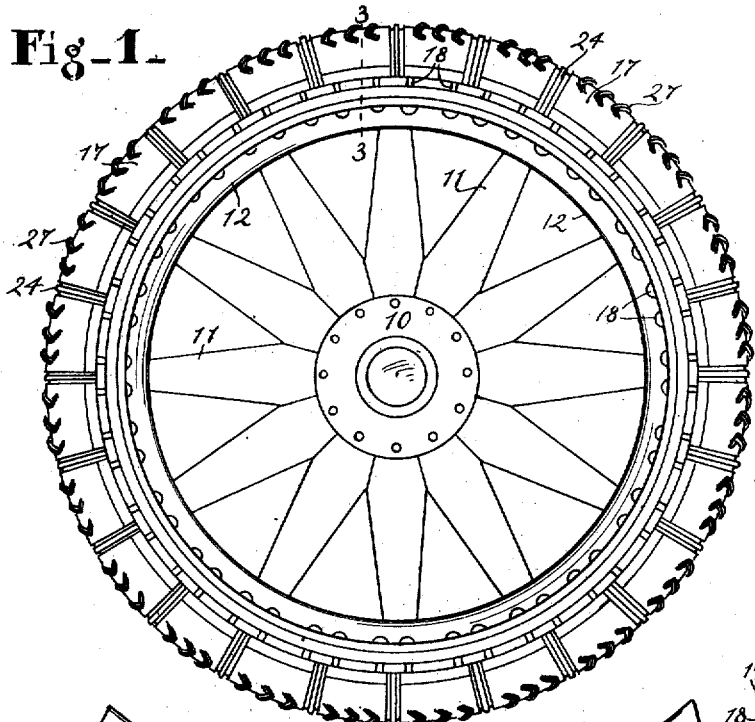
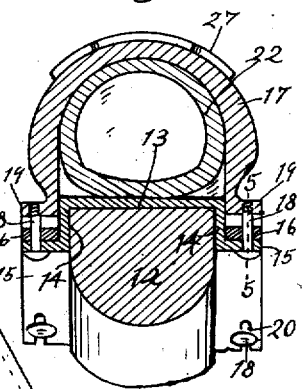
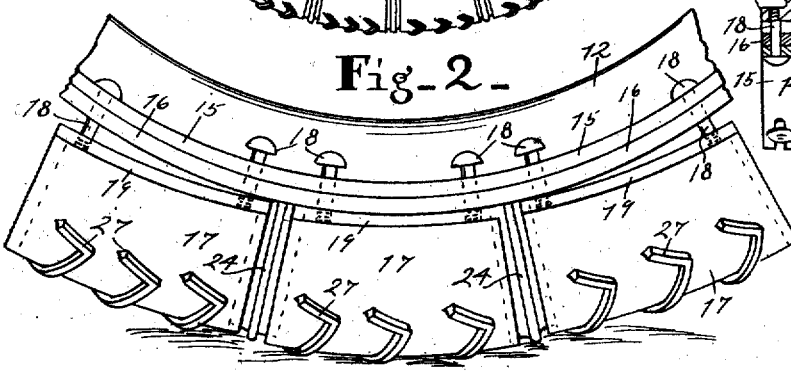
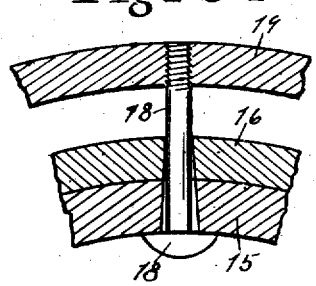
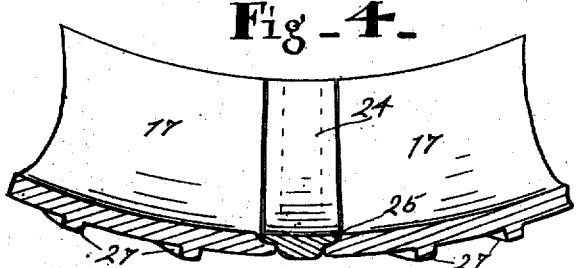
WITNESSES:
INVENTOR.
Dallas E Walker.
BY
ATTORNEY.

UNITED STATES PATENT OFFICE.

DALLAS E. WALKER, OF INDIANAPOLIS, INDIANA.

SHIELD FOR RUBBER TIRES.

No. 920,699.      Specification of Letters Patent.      Patented May 4, 1909.

Application filed June 20, 1907. Serial No. 379,891.

*To all whom it may concern:*

Be it known that I, DALLAS E. WALKER, of Indianapolis, county of Marion, and State of Indiana, have invented a certain new and useful Shield for Rubber Tires; and I do hereby declare that the following is a full, clear, and exact description thereof, reference being had to the accompanying drawings, in which like letters refer to like parts.

The object of this invention is to provide a permanent tread and protection for inflated or other rubber tires that prevents the wear on the tire, especially during skidding of the automobile on which the tire may be used, and accomplishes this object without interfering with the yielding or resilient nature of the tire.

It is well known to all users of automobiles that while the machine skids around the corners or in turning out of the road or depression in the roadway, the rubber of the tire is of necessity peeled off and the tire soon injured and destroyed. In view of the expensive nature of automobile tires, this becomes a source of considerable expense and annoyance. Furthermore, the rubber tire alone will slip when the power is turned on quickly or when the roadway is slippery.

In carrying out the object of this invention I have provided a sectional metal covering for the rubber tire that yields as the rubber tire yields, so that the yielding and resilient nature of the tire is not lost. This metal tread is provided with ribs to prevent slipping and skidding.

The general nature of this invention will be understood from the accompanying drawings and the following description and claim:

In the drawings Figure 1 is a side elevation of an automobile wheel provided with my invention. Fig. 2 is a side elevation of the lower part of the wheel on a larger scale and showing the position of parts under the weight of the automobile, parts being broken away. Fig. 3 is a transverse section on the line 3—3 of Fig. 1, showing a portion of the inner surface of the wheel in perspective. Fig. 4 is a central longitudinal section of a portion of the metal tread, the ends being broken away. Fig. 5 is a longitudinal section on the line 5—5 of Fig. 3, parts being broken away.

In the drawings 10 represents the hub, 11 the spokes and 12 the rim of a bicycle wheel. These parts may be made in the usual way. Upon the rim I secure a metal band or tire 13, as shown in Fig. 3, it being preferably flat on the periphery of the rim and provided on each lateral edge with a flange 14 that extends inwardly at a right angle from the body of the band or tire 13 and so as to hug the sides of the rim 12. The flanges 14 are therefore radial and from the inner edge there is a further and outwardly extending flange 15. Upon the external peripheries of the flanges 15 a rubber cushion or strip 16 is placed and then the larger sections 17 of the metal tread are secured in place by the screw bolts 18. These metal treads in cross section are substantially semi-circular with their ends overlapping the rim and with an outwardly extending flange 19 along each inner edge and parallel with the flanges 15. The bolts 18 extend through slots 20 in the flanges 15 of the stationary band or tire 13 and screw into the flanges 19 of the sections 17 of the metal tread. The metal tread envelops and surrounds an inflated rubber tire 22, as shown in Fig. 3. The bolts 18 are long enough to cause the flanges 19 of the metal tread to be held considerably removed from the flanges 15, when the rubber 22 is inflated as shown. This permits considerable play of the sides of the metal tread as the tube 22 is compressed and released.

The metal tread is made up of a number of the sections 17, secured as stated, with intervening short sections 24. These short sections fit in grooves 25 in the inner surface of the sections 17 at their ends, as indicated in Fig. 4, so as to form flexible joints between the sections 17. This is to permit the sections 17 of the metal tread to move inwardly toward the wheel rim under pressure, as shown in Fig. 2. That figure represents the portion of the automobile wheel which rests on the ground under a load. It is there seen that the load has compressed the inflated rubber tube within the tread and the tread has moved toward the rim to its limit, that is, by reference to Fig. 3, the flanges 19 on the metal treads 17 have moved toward the flanges 15 on the stationary metal tire plate as far as possible, the bolts 18 protruding and the rubber bands or gaskets 16 being compressed. As the wheel revolves further, this hugging of the stationary parts of the wheel by the metal tread will proceed on around the wheel and following the compressed portion of the rubber tube 22 the expansion of the tube will force the metal tread outward to its normal position.

The tread portion of the metal tread sections 17 are provided with ribs 27 to prevent the wheel slipping or skidding. From this construction it is seen that the rubber tube is wholly protected and will last a long time and that the wear is taken up by the metal tread and that they are jointed and yieldingly mounted so as not to interfere with the resiliency of the tire construction.

I have described a wheel constructed to embody my invention in what is considered now to be its most desirable form, when the wheel can be made new.

I do not desire to limit my invention to use with inflated rubber tires or tubes as solid rubber tires may be used as well.

What I claim as my invention and desire to secure by Letters Patent is:

The combination with a rubber tired wheel, of a metal tread therefor formed of long sections alternating with short sections, the ends of the short sections being beveled on their outer edges and fitting in the ends of the longer sections, the ends of which are beveled on their inner edges, and means connected with the rim of the wheel for holding the long sections in place so as to permit movement of the metal tread sections toward and away from the rim of the wheel as the rubber tire contracts and expands and render the long and short sections flexible with relation to each other.

In witness whereof, I have hereunto affixed my signature in the presence of the witnesses herein named.

DALLAS E. WALKER.

Witnesses:
  N. ALLEMONG,
  OLIVE BREEDEN.